United States Patent
Molbach et al.

[11] Patent Number: 6,064,927
[45] Date of Patent: May 16, 2000

[54] ALIGNMENT COMPONENT REPLACEMENT SYSTEM

[75] Inventors: Steven K. Molbach, Manchester; Thomas A. Meyer, Ballwin, both of Mo.; Matthew R. Winslow, Sr., Arnold, Md.

[73] Assignee: Hunter Engineering Company, Bridgeton, Mo.

[21] Appl. No.: 08/918,945

[22] Filed: Aug. 25, 1997

[51] Int. Cl.[7] .............................. G06F 17/30; G01B 7/30; B62D 17/00
[52] U.S. Cl. ..................... 701/29; 33/203.12; 33/203.13; 33/203.15; 33/203.16; 33/203.18
[58] Field of Search .......................... 701/29; 33/203.12, 33/203.13, 203.15, 203.16, 203.18

[56] References Cited

U.S. PATENT DOCUMENTS

| | | | |
|---|---|---|---|
| B1 Re. 33,144 | 7/1994 | Hunter et al. ............................ | 356/152 |
| 4,381,548 | 4/1983 | Grossman et al. ...................... | 364/551 |
| 4,879,670 | 11/1989 | Colarelli, III ............................ | 364/559 |
| 5,150,515 | 9/1992 | Merrill et al. ........................ | 33/203.12 |
| 5,301,110 | 4/1994 | Spainhour et al. ....................... | 701/29 |
| 5,513,439 | 5/1996 | Brauer et al. ........................ | 33/203.18 |
| 5,598,357 | 1/1997 | Colarelli, III et al. .................. | 364/559 |
| 5,774,361 | 6/1998 | Colarelli, III et al. .................... | 701/29 |

*Primary Examiner*—William A. Cuchlinski, Jr.
*Assistant Examiner*—Olga Hernandez
*Attorney, Agent, or Firm*—Polster, Lieder, Woodruff & Lucchesi, L.C.

[57] ABSTRACT

Wheel alignment adjustment system includes sensing apparatus for sensing alignment characteristics of a vehicle to be aligned, a memory for storing alignment specifications for a plurality of vehicles, at least one manually operable input device, operable by a user, for selecting parameters of an installed alignment component, a logic circuit for determining, from sensed alignment characteristics, corresponding alignment specifications, and the installed alignment component parameters, an adjustment to improve the alignment characteristics, and a display for displaying to a user a representation of the determined adjustment. A method using the system is also disclosed.

27 Claims, 5 Drawing Sheets

ALIGNMENT COMPONENT REPLACEMENT SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

This invention relates to vehicle wheel alignment and more particularly to and improved system for replacing alignment components such as bushings or shims.

Bushings and shims are used to adjust various alignment characteristics of a vehicle, such as caster, camber and toe. For example, certain light duty trucks make use of a bushing installed in the upper control arm over the upper ball joint stud. The taper and orientation of this bushing determines the amount of change in camber, caster, or both. Some of these bushings are infinitely adjustable (within the parameters of the size of the bushing), while others have tabs which only allow the bushings to be oriented in a limited number of positions. A separate bushing is required for each wheel. Similarly, various shims, such as rear shims, are also used to adjust toe (and/or camber) of a particular wheel, and these shims come in various types (sizes, configurations) and have varying degrees of adjustability. Although the present invention is described primarily in terms of bushings, it will be appreciated that it is equally applicable to shims specifically, and alignment adjustment components in general.

For bushings that affect a change in camber only, the orientation of the bushing in the upper control arm controls the amount of change in camber. These bushings may be installed in such a position as to result in a near zero error in camber. Other bushings affect a change in both camber and caster. These latter bushings are generally manufactured with or without tabs extending from one face of the bushing, perpendicular from the shaft of the bushing. The bushings with tabs require the technician (user) to install the bushing in one of a set number of orientations, limiting the increments of change in camber and caster available. The bushings manufactured without tabs may not have this limitation.

In the case of bushings that affect both camber and caster, some residual error may result if both camber and caster cannot both be simultaneously corrected by the same bushing. In this case, a priority must be assigned to the residual error of both the camber and caster to determine the orientation of the bushing for optimum results (i.e., minimal residual error for both camber and caster). It would be desirable to display this error to the technician, so that he is aware of the error and its effect on alignment angles. It would also be desirable for the technician to be able to adjust the error for either camber or caster, as the situation warrants. The technician may want to minimize the camber error at the expense of increasing the caster error, and vice versa. There is currently alignment equipment available which gives the technician this ability for other alignment angles, such as camber and toe, but not for camber and caster with the sue of the previously discussed bushings. Such a system is disclosed in U.S. Pat. No. 5,598,357, the disclosure of which is incorporated herein by reference.

Unlike shims, tire is always a bushing installed in the vehicle. It is a required part of the upper control arm. When there is no camber or caster change induced by a bushing, it is called a "zero" bushing. These zero bushings are used in the standard bushing replacement procedure. Specifically, the standard procedure is as follows:

1. Measure the current camber/caster angles.
2. In some cases, remove the wheel assembly.
3. Remove the currently installed bushing and install a zero bushing.
4. In some cases, replace the wheel assembly.
5. Measure the change required in camber/caster and select a new bushing.
6. In some cases, remove the wheel assembly again.
7. Remove the zero bushing and install the new, selected bushing.
8. In some cases, replace the wheel assembly a second time.
9. Verify that the change in alignment caused by the new bushing is correct.

As can be readily appreciated, removing and replacing the bushing twice (and/or the wheel assembly twice), as is required by the standard procedure, takes a tremendous amount of time and results in a considerable expense.

Many times, the technician may not have the exact bushing required in stock. In that case, it would be desirable to select another size bushing from stock that would provide minimal residual errors in camber and caster. There are charts available for this purpose, but those are generally hard to read and they have some "holes" (combinations of bushings in stock versus optimal bushings for which the charts have no suggestion). The same situation exists for shims.

The technician is often forced to guess as to correct orientation of a bushing in the installation. Although the charts provide an angular orientation at which the bushing is to be installed, it is not always altogether clear how the particular bushing is to be rotated to the desired orientation. If would be helpful if some means were available to eliminate errors in the actual orientation of the bushing during installation.

BRIEF SUMMARY OF THE INVENTION

Among the various objects and features of the present invention may be noted the provision of a vehicle wheel alignment adjustment system which facilitates the selection and installation of alignment adjustment components to correct alignment angles such as caster, camber and toe.

Another object is the provision of such a system which may be interactively used by a technician to accommodate his requirements and preferences.

A third object is the provision of such a system which accurately determines the correct alignment component type and orientation to best correct alignment angles.

A fourth object is the provision of such a system which accurately determines the correct orientation of an adjustable alignment component to best correct alignment angles.

A fifth object is the provision of such a system which provides an indication of residual error in alignment angles which would result from using a selected alignment component.

A sixth object is the provision of such a system which expedites the use of alignment components to correct errors in alignment angles by allowing the user to enter information about existing components and using this information to determine the correct component type or orientation to improve alignment.

A seventh object is the provision of such a system which significantly reduces the amount of time necessary to replace an alignment component.

An eighth object is the provision of such a system which facilitates the installation of an alignment component at the proper orientation.

Other objects and features will be in part apparent and in part pointed out hereinafter.

Briefly, a wheel alignment adjustment system of the present invention includes sensing apparatus for sensing alignment characteristics of a vehicle to be aligned, a memory for storing alignment specifications for a plurality of vehicles, and at least one manually operable input device, operable by a user, for selecting parameters of an installed alignment component. A logic circuit is provided to determine, from sensed alignment characteristics, corresponding alignment specifications, and the installed alignment component parameters, an adjustment to improve the alignment characteristics. A display is also included for displaying to a user a representation of the determined adjustment.

A method of the present invention for replacing a bushing in a vehicle suspension to improve alignment includes the steps of measuring alignment angles corresponding to a wheel associated with an installed alignment bushing, removing the wheel to gain access to the installed alignment bushing, recording parameters of the installed alignment bushing, removing the installed alignment bushing, electronically determining a bushing size and orientation to improve alignment (from the alignment angles, specifications for the alignment angles, and the recorded parameters of the installed alignment bushing), installing a bushing of the electronically determined size at the electronically determined orientation, replacing the wheel, and measuring the alignment angles to determine if the alignment has been improved.

A method of the present invention for replacing a rear shim in a vehicle suspension to improve alignment includes the steps of measuring alignment angles corresponding to a rear wheel associated with an installed alignment shim, removing the wheel to gain access to the installed alignment shim, recording parameters of the installed alignment shim, removing the installed alignment shim, electronically determining a shim type and orientation to improve alignment (from the alignment angles, specifications for the alignment angles, and the recorded parameters of the installed alignment shim), installing a shim of the electronically determined type at the electronically determined orientation, replacing the wheel, and measuring the alignment angles to determine if the alignment has been improved.

BRIEF DESCRIPTION OF THE SEVERAL
VIEWS OF THE DRAWINGS

Similar reference characters indicate similar parts throughout the several views of the drawings.

DETAILED DESCRIPTION OF THE
INVENTION

Figure 1:
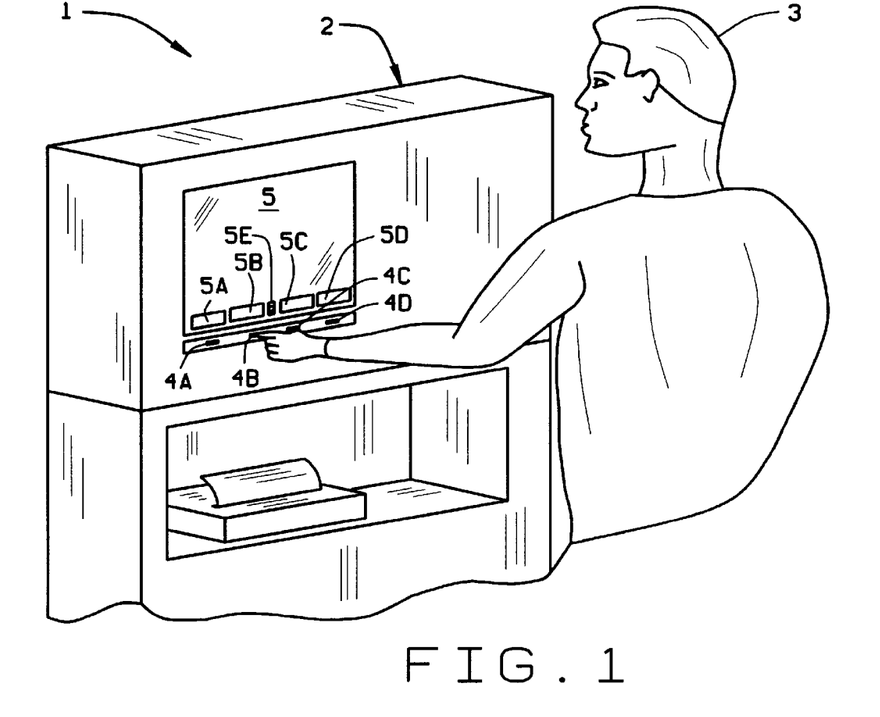
FIG. 1 is a perspective view of a vehicle alignment system console, with a technician/user, which includes the system of the present invention.

It is preferred that the present invention be embodied in a computer controlled vehicle wheel alignment system 1, such as those shown in U.S. Reissue Pat. No. 33,144 to Hunter et al., U.S. Pat. No. 5,598,357 to Colarelli and January, and U.S. Pat. No. 4,381,548 to Grossman and January, the disclosures of which are incorporated herein by reference. Alignment system 1 includes a console 2 suitably mounted for use by a technician/user 3. System 1 includes manually operable input devices 4, such as the manually operable input keys or switches 4A–4D shown in FIG. 1, and a display 5. Display 5 is preferably a CRT computer monitor type display. It should be understood that any number of manually operable input devices 4 may be used, such as a keyboard, a mouse, or a light pen, all of which are conventional input devices. For brevity these alternative input devices are not shown.

Figure 2:
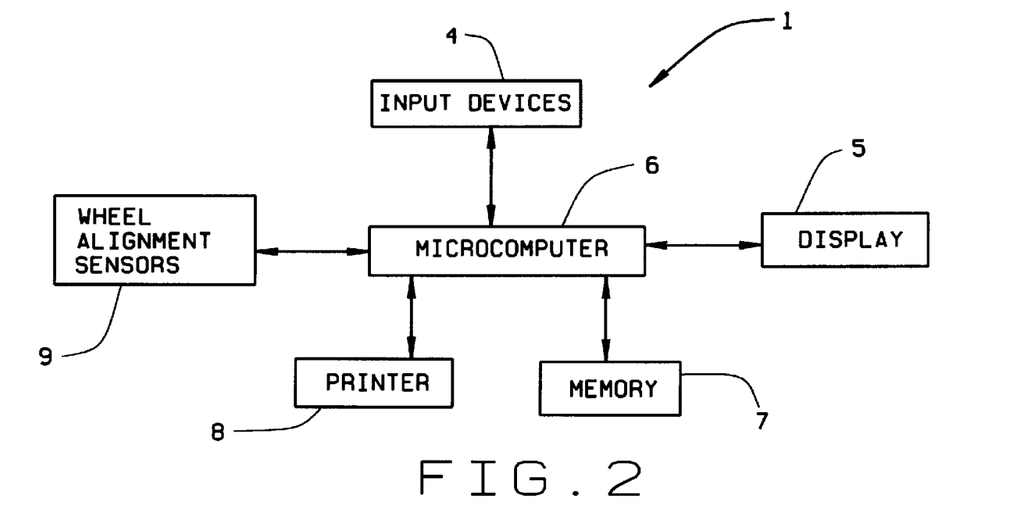
FIG. 2 is a block diagram of the circuitry of the system of FIG. 1.

Input device 4 and display 5 (see FIG. 2) are connected to a microcomputer 6 (or other suitable logic circuit). The microcomputer is also connected to a digital memory 7 and a printer 8. It should be understood that memory 7 could be internal to the microcomputer, depending upon the particular microcomputer used. Suitable alignment sensors 9 are also operatively connected to microcomputer 6 for supplying measured alignment information to the microcomputer. Such sensors are shown in the above-mentioned U.S. patents, and in U.S. Pat. No. 4,879,670 to Colarelli, the disclosure of which is also incorporated herein by reference. System 1 works interactively with the technician/user. This is described in detail in the aforementioned U.S. Pat. No. 5,598,357.

It is conventional for vehicle wheel alignment systems such as system 1 to have stored in memory 7 a database of vehicle specifications, including vehicle wheel alignment specifications, so that the alignment specifications of the vehicle under test are accessed for use upon identification to the system of the vehicle make, model and year. In addition, type and size (shape, thickness, taper, etc.) information is stored for a plurality of adjustment components such as bushings and shims. This information is used by the microcomputer, as discussed below, both to determine which adjustment component should be used at what orientation to improve alignment, and to determine alignment errors which would be present were an installed component to be removed. This latter feature allows the microcomputer to determine the correct alignment component to be used in significantly less time than with existing systems.

Figure 3:
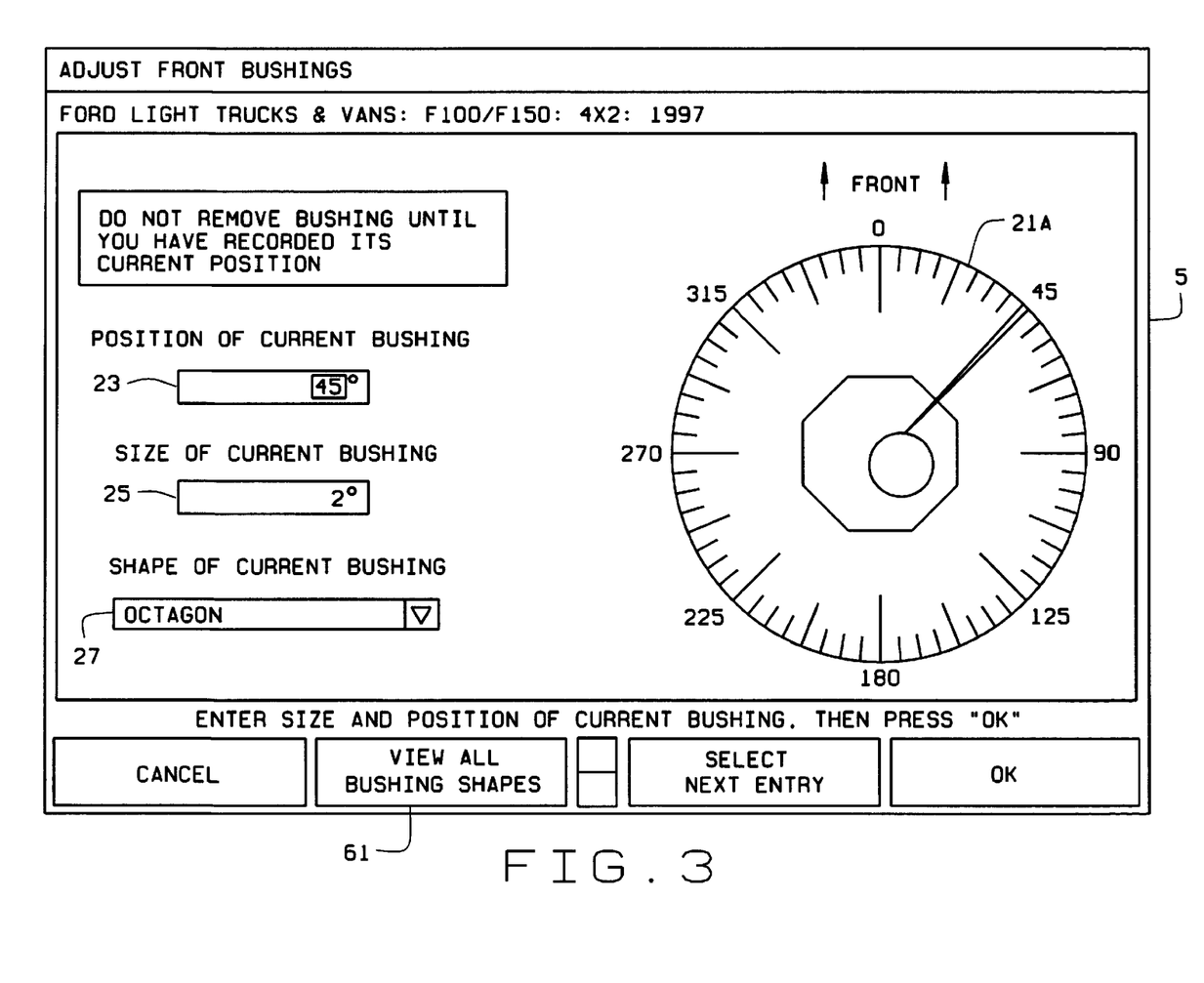
FIG. 3 is a screen display used in the system of FIG. 1.
Figure 4:
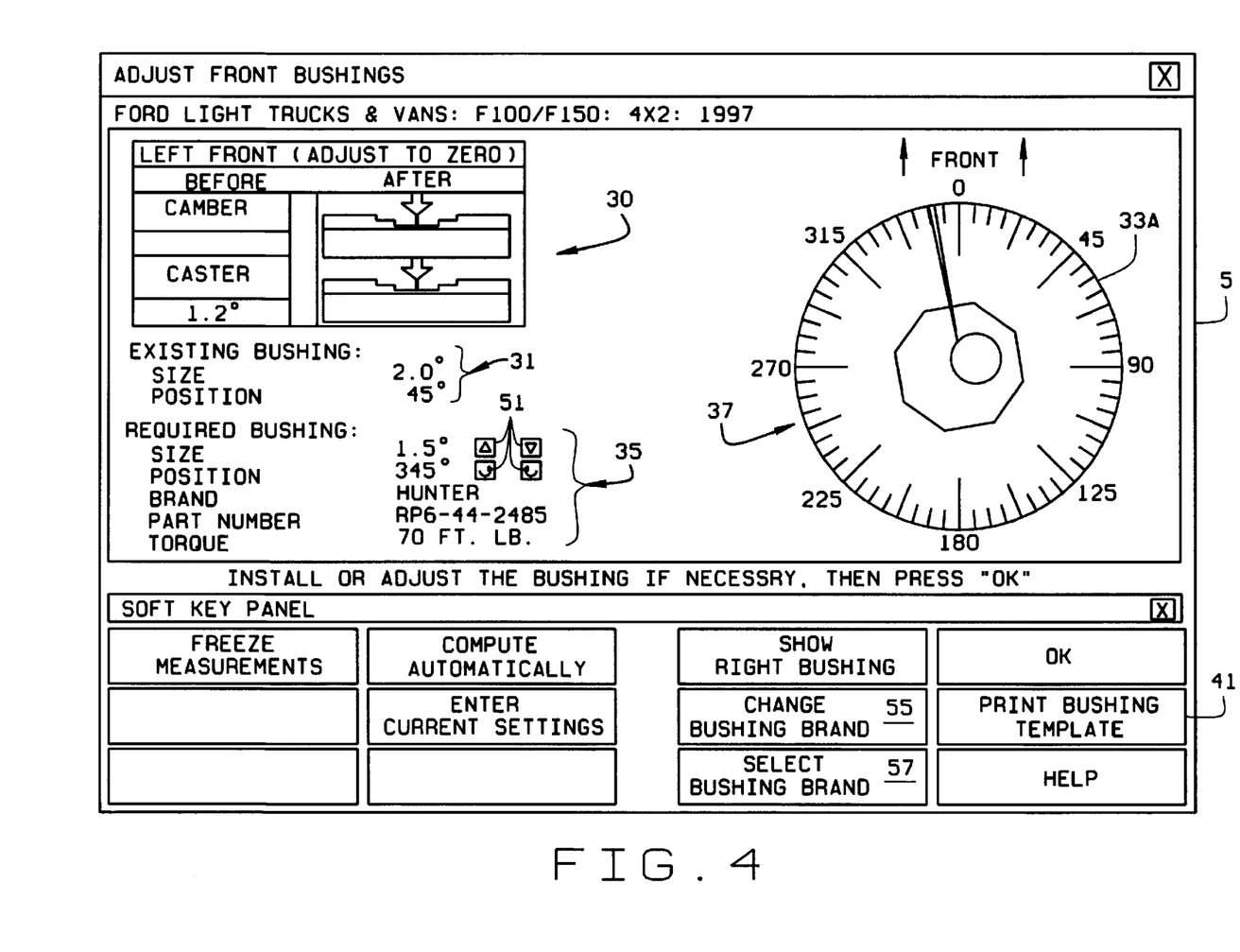
FIG. 4 is a view similar to that of FIG. 3 showing a subsequent stage of the process.
Figure 5:
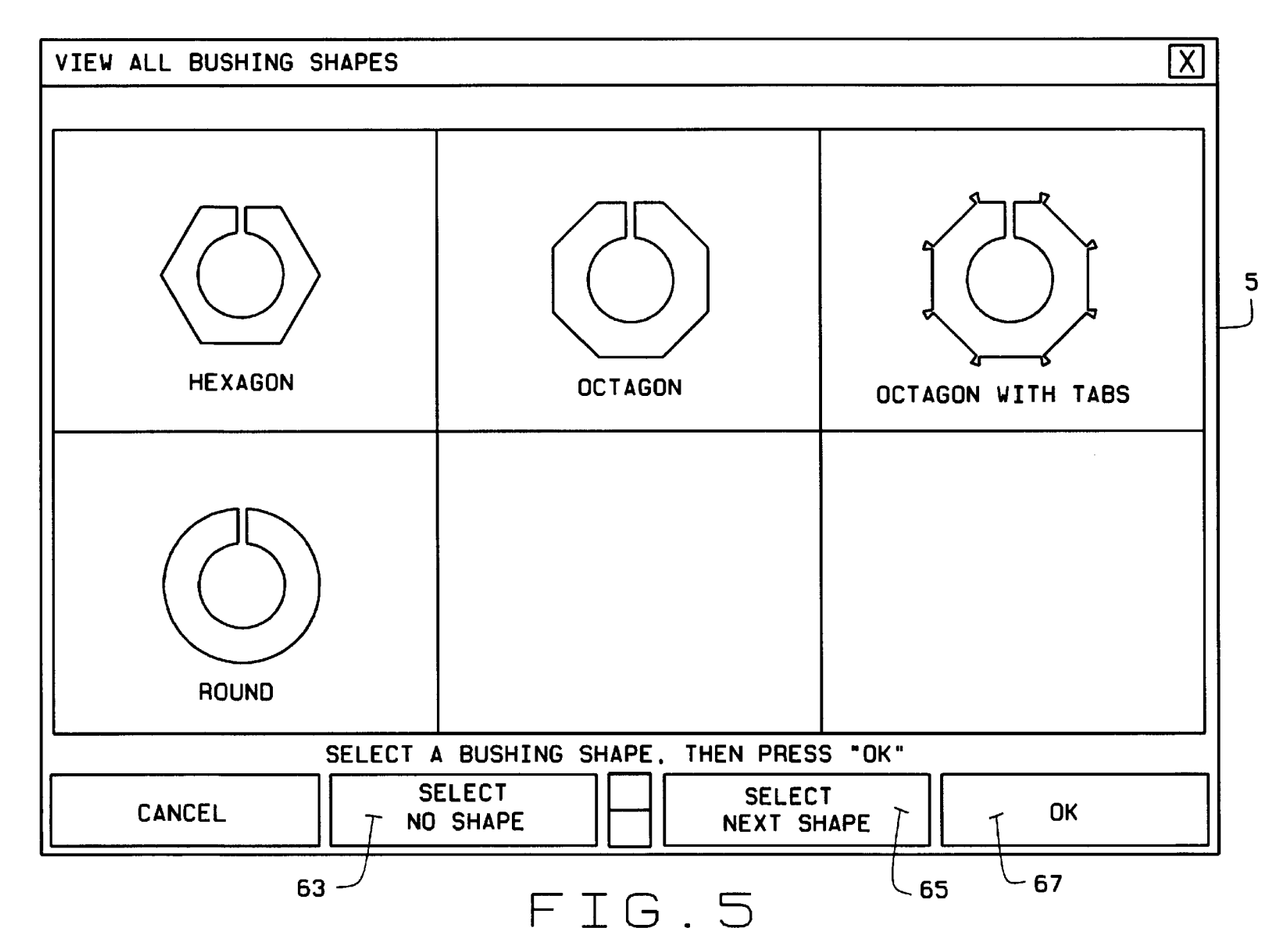
FIG. 5 is a view similar to FIGS. 3 and 4 illustrating the selection of bushing shapes in the present invention.
Figure 6:
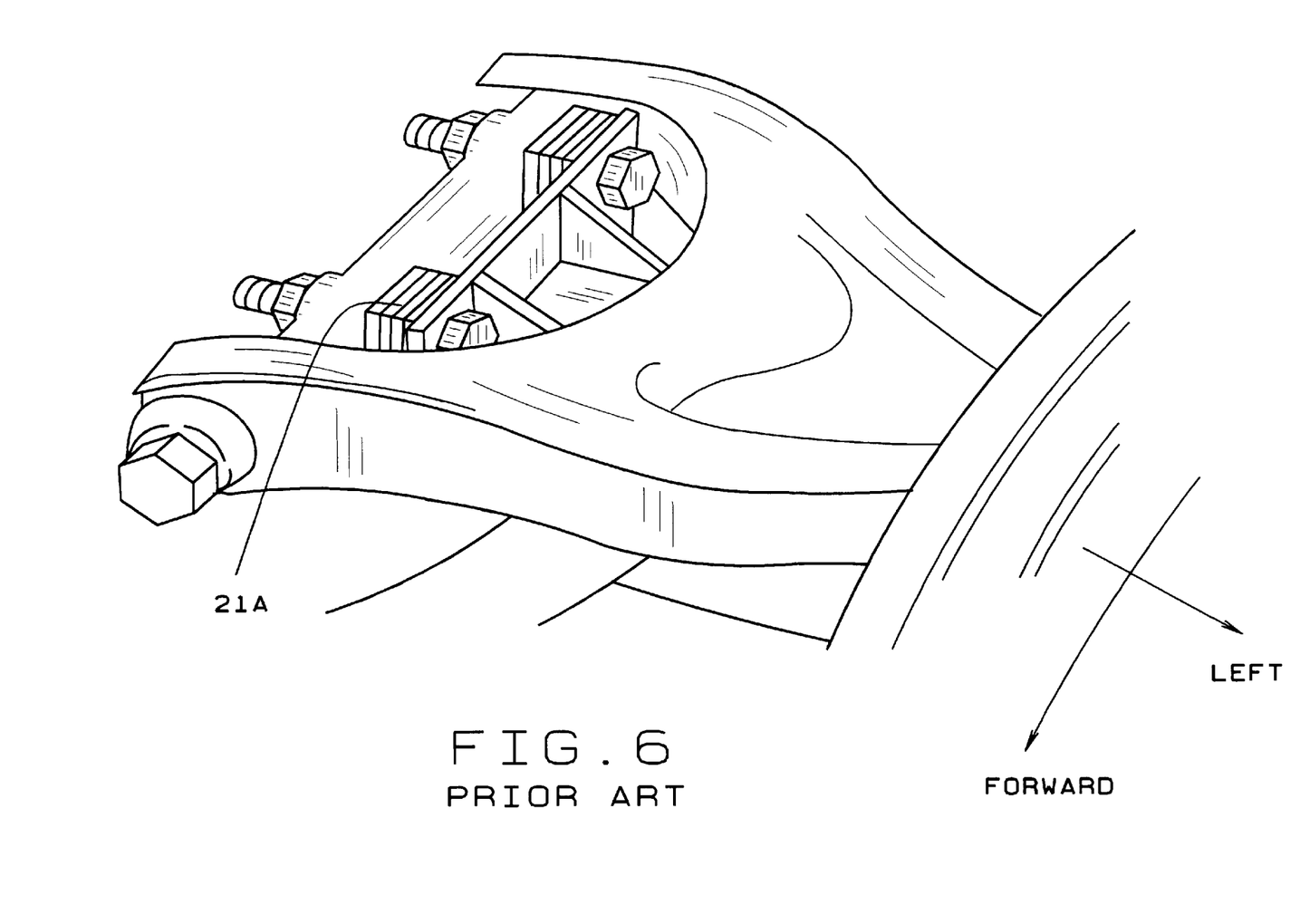
FIG. 6 is a perspective view of a prior art vehicle suspension component, illustrating the placement of an installed bushing.

Turning to FIGS. 3–5, the present invention is illustrated in connection with replacement of a bushing, although it should be appreciated that shims or other adjustment components may be used as well. The method illustrated in FIGS. 3 and 4 includes the following steps:

1. Using sensors 9 to measure alignment angles (in this case caster and camber) corresponding to a wheel associated with an installed alignment bushing (not shown). A representation of the installed bushing 21 is labelled 21A on FIG. 3 and is used to facilitate the replacement method by the user.

2. The technician/user removes the wheel to gain access to the installed alignment bushing.

3. The user records parameters of the installed alignment bushing. This is illustrated by FIG. 3. Note that this particular display screen has fields which allow the technician to enter the position of the current bushing (field 23), the size of the current bushing (field 25, and the shape of the current bushing (field 27). This information is readily entered using conventional manual input devices such as a keyboard, a mouse, etc. Once this step is completed, the user presses the switch 4C associated with the display "OK" to continue the process.

4. Once the size and position of the current bushing is entered, the installed alignment bushing is removed.

5. Microcomputer 6 electronically determines a bushing size and orientation to improve alignment from the measured alignment angles (from sensors 9), specifications for the alignment angles (from memory 7), and the recorded parameters of the installed alignment bushing. The microcomputer 6 causes display 5 to display the results of this determination as shown in FIG. 4. Specifically, the screen shown in FIG. 4 displays to the technician the size and position of the bushing which was just removed (field 31); size, position and identifying information concerning the new bushing (not shown) to be installed (field 35); a representation 33A of the bushing to be installed illustrating the proper orientation for the bushing (field 37); and a representation of the "before" and "after" camber and caster results (field 39). Note that the "after" results are calculated, not measured, since at this point the new bushing has not been installed. With this feature, the user can readily determine whether the residual camber and/or caster errors will be acceptable.

6. The user then installs new bushing of the electronically determined size at the electronically determined orientation. To facilitate this, the screen of FIG. 4 includes not only the representation 37 of the correct orientation, but also allows (field 41) the user to request a printed copy of the bushing template.

7. The user then replaces the wheel and the microcomputer measures the alignment angles to determine if the alignment has been improved to complete the process.

Note that with the method of the present invention, the user only has to remove the wheel and replace it once, as opposed to twice with the conventional method. This results in a tremendous savings in time and expense.

Turning back to FIG. 4, note that field 35 includes a set of display buttons 51. Using these buttons (by clicking on them with a mouse, for example), the user can change both the size and position of the bushing to be installed. In response, the microcomputer calculates and displays the residual errors which would result in both caster and camber in display field 39. Thus, when the user does not have the bushing specified by the computer, a substitution can be made of a bushing which is in stock so long as the residual errors are acceptable. Similarly, if it would not be possible to install the new bushing at the desired position (because of tabs, for example), the user can change the orientation using buttons 51 and see displayed the caster and camber errors which will result. Similarly, the display screen of FIG. 4 includes buttons 55 and 57 for changing the bushing brand to one available to the technician.

Note that in some instances, it will not be necessary to totally remove installed bushing. This occurs when the size of the current bushing is correct but it needs to be positioned at a different orientation. In this case, rather than totally remove the installed bushing, the user simply moves it from the "before" orientation and installs it at the "after" orientation.

FIGS. 3 and 4 show a bushing of octagonal shape. As seen in FIG. 5, however, bushings come in a variety of shapes. To change the bushing shape, the user may actuate the arrow at the end of field 27 (FIG. 3) to cause the display of a list of bushing shapes (the desired one of which may then be selected), or the user may actuate button 61 (FIG. 3) which takes the user to the screen of FIG. 5. In FIG. 5, the user simply uses the key 65 labelled "select next shape" (or alternatively the tab or arrow keys on the keyboard) to highlight and select the desired bushing shape.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A wheel alignment adjustment system comprising:

sensing apparatus for sensing alignment characteristics of a vehicle to be aligned;

a memory for storing alignment specifications for at least one vehicle;

at least one manually operable input device, operable by a user, for selecting parameters of a bushing;

a logic circuit for determining, from sensed alignment characteristics, corresponding alignment specifications, and the bushing parameters, an adjustment to improve the alignment characteristics;

a display for displaying to a user a representation of the determined adjustment;

wherein said logic circuit is responsive to sensed alignment characteristics, stored alignment specifications, and parameters of the installed bushing to select a bushing and a bushing orientation to improve the alignment characteristics, and said logic circuit additionally responsive to selection of a bushing and a bushing orientation to determine the residual caster error and residual camber error which would result from installation of the selected bushing at the selected orientation.

2. A wheel alignment adjustment system comprising:

sensing apparatus for sensing alignment characteristics of a vehicle to be aligned;

a memory for storing alignment specifications for at least one vehicle;

at least one manually operable input device, operable by a user, for selecting parameters of a bushing;

a logic circuit for determining, from sensed alignment characteristics, corresponding alignment specifications, and the bushing parameters, an adjustment to improve the alignment characteristics;

a display for displaying to a user a representation of the determined adjustment;

wherein said logic circuit is responsive to sensed alignment characteristics, alignment specifications, and parameters of the installed bushing to select a bushing orientation of the installed bushing to improve the alignment characteristics, and to determine the residual caster error and camber error which would result from installation of the installed bushing at said bushing orientation.

3. A method of replacing a bushing in a vehicle suspension to improve alignment comprising:

measuring alignment angles corresponding to a wheel associated with an installed alignment bushing;

recording parameters of the installed alignment bushing;

removing the installed alignment bushing;

electronically determining orientation of said removed bushing to improve alignment using the recorded parameters of said installed alignment bushing;

re-installing said removed bushing at the electronically determined orientation.

4. A method of replacing a bushing in a vehicle suspension to improve alignment comprising:

measuring alignment angles corresponding to a wheel associated with an installed alignment bushing;

recording parameters of the installed alignment bushing;

removing the installed alignment bushing;

electronically determining a bushing size and orientation to improve alignment using the recorded parameters of the installed alignment bushing, said electronically determined bushing size differing from that of the installed bushing;

installing a bushing of the electronically determined size at the electronically determined orientation.

5. A method of replacing a bushing in a vehicle suspension to improve alignment comprising:

measuring alignment angles corresponding to a wheel associated with an installed alignment bushing;

recording parameters of the installed alignment bushing;

removing the installed alignment bushing;

manually selecting a bushing type to be installed;

electronically determining the size and orientation of said selected bushing to improve alignment using the recorded parameters of the installed alignment bushing;

electronically determining the residual caster and camber errors which will result upon installation of the selected bushing type;

installing said selected bushing having the electronically determined size at the electronically determined orientation; and displaying the residual errors to the user.

6. A method of replacing a rear shim in a vehicle suspension to improve alignment comprising:

measuring alignment angles corresponding to a rear wheel associated with an installed alignment shim;

recording parameters of the installed alignment shim;

removing the installed alignment shim;

electronically determining an orientation of the removed alignment shim to improve alignment using the recorded parameters of the installed alignment shim;

re-installing the installed shim at the electronically determined orientation.

7. A method of replacing a rear shim in a vehicle suspension to improve alignment comprising:

measuring alignment angles corresponding to a rear wheel associated with an installed alignment shim;

recording parameters of the installed alignment shim;

removing the installed alignment shim;

electronically determining a shim type and orientation to improve alignment using the recorded parameters of the installed alignment shim, said electronically determined shim type differing from that of the installed shim; and installing a shim of the electronically determined type at the electronically determined orientation.

8. A wheel alignment adjustment system comprising:

sensing apparatus for sensing alignment characteristics of a vehicle to be aligned;

a memory for storing alignment specifications for at least one vehicle;

at least one manually operable input device, operable by a user, for selecting the type and orientation of an installed rear shim;

a logic circuit for determining from measured alignment characteristics, corresponding alignment specifications, and the type and orientation of the installed rear shim, alignment characteristics of a rear wheel in the absence of said installed rear shim, and for selecting a type and orientation of a new rear shim to at least partially improve said alignment characteristics, said type of new rear shim selected differs from said installed rear shim; and a display for displaying to a user a representation of the determined adjustment.

9. A wheel alignment adjustment system comprising:

sensing apparatus for sensing alignment characteristics of a vehicle to be aligned;

a memory for storing alignment specifications for at least one vehicle;

at least one manually operable input device, operable by a user for selecting parameters of a bushing, said manually operable input device usable for selecting parameters of a new bushing to be installed;

a logic circuit for determining, from sensed alignment characteristics, corresponding alignment specifications, and the bushing parameters, an adjustment to improve the alignment characteristics, said logic circuit being responsive to the selection of a new bushing of a particular size and shape to determine the resulting change in caster and camber which would result from installation of the selected bushing; and a display for displaying to a user a representation of the determined adjustment.

10. A wheel alignment adjustment system as set forth in claim 9 wherein the display is responsive to the selection of a new bushing of a particular size and shape to display the configuration in which the new bushing should be installed.

11. A method of replacing a currently installed alignment component in a vehicle suspension to alter vehicle alignment comprising the steps of:

measuring existing alignment angles corresponding to a wheel associated with said currently installed alignment component;

recording parameters of the currently installed alignment component;

removing the currently installed alignment component;

electronically determining a replacement alignment component size and orientation to alter said vehicle alignment using said measured existing alignment angles and said recorded parameters of said currently installed alignment component; and installing a replacement alignment component of the electronically determined size at the electronically determined orientation.

12. The method of claim 11 for replacing a currently installed alignment component in a vehicle suspension to alter vehicle alignment wherein said currently installed alignment component is a bushing.

13. The method of claim 11 for replacing a currently installed alignment component in a vehicle suspension to alter vehicle alignment wherein said currently installed alignment component is a shim.

14. The method as set forth in claim 13 wherein the installed alignment component is a rear shim.

15. The method as set forth in claim 13 wherein the installed alignment component is a front shim.

16. The method of replacing a currently installed shim in a vehicle suspension to alter vehicle alignment as set forth in claim 13 further including the steps of manually selecting a replacement shim type to be installed, electronically determining the residual errors which will result upon installation of the selected replacement shim type, and displaying the residual errors to a user.

17. A wheel alignment adjustment system comprising:

sensing apparatus for sensing current alignment characteristics of a vehicle to be aligned, said current alignment characteristics established by vehicle suspension components including at least one already installed alignment component;

a memory for storing alignment specifications for at least one vehicle;

at least one manually operable input device, operable by a user, for selecting parameters of said already installed alignment component contributing to said current alignment characteristics;

a logic circuit for determining, from
  (i) sensed current alignment characteristics,
  (ii) said corresponding alignment specifications, and
  (iii) said selected parameters of said already installed alignment component, an adjustment to alter alignment characteristics of said vehicle; and a display for displaying to a user a representation of the determined adjustment.

18. A wheel alignment adjustment system as set forth in claim 17 wherein the already installed alignment component is a front shim, the manually operable input device being operable by a user to select the type and orientation of an already installed front shim.

19. A wheel alignment adjustment system as set forth in claim 17 where the already installed alignment component is a bushing.

20. A wheel alignment adjustment system as set forth in claim 19 wherein the parameters of the already installed alignment component are selected from the group consisting of size, shape, and orientation of the installed bushing.

21. A wheel alignment adjustment system as set forth in claim 19 wherein the logic circuit is responsive to sensed alignment characteristics, stored alignment specifications, and parameters of the already installed bushing to select a replacement bushing and a bushing orientation to alter the alignment characteristics of the vehicle.

22. A wheel alignment adjustment system as set forth in claim 19 the sensing apparatus senses caster and camber of a wheel on the vehicle.

23. A wheel alignment adjustment system as set forth in claim 22 wherein the memory has stored therein caster and camber specifications for a plurality of vehicles.

24. A wheel alignment adjustment system as set forth in claim 17 where the already installed alignment component is a rear shim, the manually operable input device being operable by a user to select the type and orientation of an already installed rear shim.

25. A wheel alignment adjustment system as set forth in claim 24 wherein the logic circuit is responsive to the selection of the type and orientation of an installed rear shim and to the measured alignment characteristics to determine the values of the alignment characteristics of a rear wheel in the absence of said installed rear shim.

26. A wheel alignment adjustment system as set forth in claim 25 wherein the logic circuit is responsive to the determination of said values of the alignment characteristics to select a type and orientation of a rear shim to at least partially improve the alignment characteristics.

27. A wheel alignment adjustment system as set forth in claim 26 wherein the type of rear shim selected is the same as the installed shim and the orientation of the selected shim differs from the orientation of the installed shim.

* * * * *